US008849553B2

(12) United States Patent
Matsuoka

(10) Patent No.: US 8,849,553 B2
(45) Date of Patent: Sep. 30, 2014

(54) ROAD-INSTALLED DRIVING SUPPORTING DEVICE, VEHICLE-MOUNTED DRIVING SUPPORTING DEVICE, AND DRIVING SUPPORTING SYSTEM

(75) Inventor: Katsuhiro Matsuoka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 157 days.

(21) Appl. No.: 13/141,228

(22) PCT Filed: Feb. 27, 2009

(86) PCT No.: PCT/JP2009/053722
§ 371 (c)(1),
(2), (4) Date: Jun. 21, 2011

(87) PCT Pub. No.: WO2010/097944
PCT Pub. Date: Sep. 2, 2010

(65) Prior Publication Data
US 2011/0307121 A1 Dec. 15, 2011

(51) Int. Cl.
*G06F 19/00* (2011.01)
*G06G 7/70* (2006.01)
*G06G 7/76* (2006.01)

(52) U.S. Cl.
USPC ........... 701/117; 340/902; 340/904; 340/909; 701/301; 398/130

(58) Field of Classification Search
USPC ................. 701/117, 437, 119, 300–302, 214; 340/905, 436, 902–903, 906–907, 909, 340/904, 991; 342/357.02; 398/130
See application file for complete search history.

(56) References Cited

U.S. PATENT DOCUMENTS

| | | | | |
|---|---|---|---|---|
| 7,098,806 | B2 * | 8/2006 | Bachelder | 340/906 |
| 7,248,149 | B2 * | 7/2007 | Bachelder et al. | 340/425.5 |
| 7,327,280 | B2 * | 2/2008 | Bachelder et al. | 340/906 |
| 7,860,639 | B2 * | 12/2010 | Yang | 701/117 |
| 7,864,071 | B2 * | 1/2011 | Bachelder et al. | 340/906 |
| 7,873,474 | B2 * | 1/2011 | Yamamoto et al. | 701/301 |

(Continued)

FOREIGN PATENT DOCUMENTS

| | | | | |
|---|---|---|---|---|
| CN | 102326191 | A | * | 1/2012 |
| DE | 112009004419 | T5 | * | 7/2012 |

(Continued)

OTHER PUBLICATIONS

Mobile phone application for safe driving at an intersection; Onda, Keisuke ; Ishikawa, Noriaki ; Watanabe, Kajiro ; Kobayashi, Kazuyuki ; Kurihara, Yousuke; SICE Annual Conference 2010, Proceedings of ; Publication Year: 2010 , pp. 2428-2431.*

(Continued)

*Primary Examiner* — Cuong H Nguyen
(74) *Attorney, Agent, or Firm* — Oliff PLC

(57) ABSTRACT

A vehicle-mounted driving supporting device 2 supports driving on the basis of the presence of a nonpriority vehicle A entering a priority road 50 from a nonpriority road 40. The vehicle-mounted driving supporting device 2 includes an information provision determination device 34 which, when a host vehicle is traveling on the priority road 50, determines whether or not driving support is required on the basis of the specification regarding driving support of the nonpriority vehicle A received from the outside. Therefore, it is possible to avoid a driver from feeling bothered.

3 Claims, 8 Drawing Sheets

(56) References Cited

U.S. PATENT DOCUMENTS

| | | | | |
|---|---|---|---|---|
| 8,285,476 | B2 * | 10/2012 | Yamada | 701/300 |
| 8,305,236 | B2 * | 11/2012 | Mori et al. | 340/936 |
| 8,369,577 | B2 * | 2/2013 | Miyajima | 382/106 |
| 8,428,078 | B2 * | 4/2013 | Nakaya et al. | 370/437 |
| 8,433,503 | B2 * | 4/2013 | Miyakoshi | 701/117 |
| 2006/0155427 | A1 * | 7/2006 | Yang | 701/1 |
| 2007/0282532 | A1 * | 12/2007 | Yamamoto et al. | 701/301 |
| 2010/0019937 | A1 * | 1/2010 | Mori et al. | 340/936 |
| 2010/0174486 | A1 * | 7/2010 | Wakabayashi | 701/214 |
| 2011/0276258 | A1 * | 11/2011 | Miyakoshi | 701/117 |

FOREIGN PATENT DOCUMENTS

| | | | | |
|---|---|---|---|---|
| JP | A-2004-164315 | | | 6/2004 |
| JP | A-2007-148765 | | | 6/2007 |
| JP | A-2007-299193 | | | 11/2007 |
| JP | A-2007-323184 | | | 12/2007 |
| JP | A-2008-126755 | | | 6/2008 |
| JP | 4883243 | B2 | * | 2/2012 |
| JP | 2011501375 | | * | 8/2012 |
| WO | WO 02/103652 | A1 | | 12/2002 |
| WO | WO 2010097892 | A1 | * | 9/2010 |

OTHER PUBLICATIONS

Development of an intelligent traffic light for reducing traffic accidents; Matsuzaki, Katsuya ; Nitta, Masuhiro ; Kato, Kiyotaka Control, Automation and Systems, 2008. ICCAS 2008. International Conference on Digital Object Identifier: 10.1109/ICCAS.2008.4694681 ; Publication Year: 2008 , pp. 443-447.*

Safe intersections: At the crossing of hybrid systems and verification; Loos, Sarah M. ; Platzer, André Intelligent Transportation Systems (ITSC), 2011 14th International IEEE Conference on Digital Object Identifier: 10.1109/ITSC.2011.6083138; Publication Year: 2011 , pp. 1181-1186.*

Efficient and Reliable Broadcast in Intervehicle Communication Networks: A Cross-Layer Approach; Yuanguo Bi et al.; IEEE Transactions on Vehicular Technology, vol. 59, No. 5; Jun. 2010, pp. 2404-2417.*

Adaptive beaconing for delay-sensitive and congestion-aware traffic information systems; Sommer, Christoph ; Tonguz, O.K. ; Dressler, Falko; Vehicular Networking Conference (VNC), 2010 IEEE; Digital Object Identifier: 10.1109/VNC.2010.5698242 Publication Year: 2010 , pp. 1-8.*

An application of routing protocols for Vehicular Ad-hoc Networks; Tomer, P. ; Chandra, M.; Networking and Information Technology (ICNIT), 2010 International Conference on; DOI: 10.1109/ICNIT.2010.5508540; Publication Year: 2010 , pp. 157-160.*

Active RFID positioning of vehicles in road traffic; Enzhan Zhang ; Weili Jiang ; Yujun Kuang ; Umer, M.A.; Communications and Information Technologies (ISCIT), 2011 11th International Symposium on; DOI: 10.1109/ISCIT.2011.6089737 Publication Year: 2011 , pp. 222-227.*

International Search Report dated Apr. 7, 2009 in corresponding International Application No. PCT/JP2009/053722.

Jul. 6, 2012 Extended European Search Report issued in European Patent Application No. 09840797.6.

International Preliminary Report on Patentability dated Oct. 27, 2011 in International Application No. PCT/JP2009/053722.

* cited by examiner

ROAD-INSTALLED DRIVING SUPPORTING DEVICE, VEHICLE-MOUNTED DRIVING SUPPORTING DEVICE, AND DRIVING SUPPORTING SYSTEM

TECHNICAL FIELD

The present invention relates to a device and system for supporting driving.

BACKGROUND ART

In the related art, a driving supporting system is known which prevents a head-on collision. For example, in a system described in Patent Literature 1, when there are a priority vehicle which is traveling on a priority road and a nonpriority vehicle which is traveling on a nonpriority road which crosses the priority road, information regarding the nonpriority vehicle which is driven hazardously is notified through vehicle-to-vehicle communication from the nonpriority vehicle to the priority vehicle.

[Patent Literature 1] Japanese Unexamined Patent Application Publication No. 2007-323184

SUMMARY OF INVENTION

Technical Problem

However, in the driving supporting device of the related art, information regarding the nonpriority vehicle may be notified more than is necessary to the priority vehicle which is given priority for traveling. For this reason, for example, the driver of the priority vehicle may feel bothered.

The invention has been finalized in order to solve the technical problem, and an object of the invention is to provide a driving supporting device capable of appropriately supporting the driving of a priority vehicle which is traveling on a priority road.

Solution to Problem

According to an aspect of the invention, there is provided a vehicle-mounted driving supporting device which supports driving depending on the presence of a nonpriority vehicle entering a priority road from a nonpriority road. The vehicle-mounted driving supporting device includes a support determination unit which, when a host vehicle is a priority vehicle which is traveling on the priority road, determines whether or not driving support is required on the basis of the specification regarding driving support of the nonpriority vehicle received from the outside.

With this aspect, when driving support is executed depending on the presence of a nonpriority vehicle entering a priority road from a nonpriority road during traveling on the priority road, it is determined by the support determination unit whether or not the driving support is required on the basis of the specification regarding driving support of the nonpriority vehicle received from the outside. For this reason, for example, only when the nonpriority vehicle cannot receive information regarding driving support from the outside, the driving support can be executed. Therefore, it becomes possible to appropriately support the driving of the host vehicle as a priority vehicle.

The support determination unit may determine whether or not the driving support is required on the basis of information regarding a function of receiving outside information of the nonpriority vehicle. With this configuration, the above-described effect can be further achieved.

When the nonpriority vehicle is configured to perform vehicle-to-vehicle communication, the support determination unit may not execute the driving support.

With this configuration, it is determined by the support determination unit whether or not the driving support is required on the basis of whether or not the nonpriority vehicle can perform vehicle-to-vehicle communication. For this reason, for example, it is possible to avoid driving support from being executed on the basis of the presence of a nonpriority vehicle which can detect the presence of a priority vehicle through vehicle-to-vehicle communication. Therefore, it becomes possible to appropriately support the driving of the host vehicle as a priority vehicle.

When the nonpriority vehicle can acquire information regarding the priority vehicle from an optical beacon, the support determination unit may not execute the driving support.

With this configuration, it is determined by the support determination unit whether or not the driving support is required on the basis of whether or not the nonpriority vehicle can acquire information regarding the priority vehicle from the optical beacon. For this reason, for example, with regard to a nonpriority vehicle which undergoes driving support on the basis of the presence of a priority vehicle, it is possible to avoid driving support from being executed on the priority vehicle. Therefore, it becomes possible to appropriately support the driving of the host vehicle as a priority vehicle.

According to another aspect of the invention, there is provided a road-installed driving supporting device which transmits information regarding a nonpriority vehicle entering a priority road from a nonpriority road to a priority vehicle which is traveling on the priority road. The road-installed driving supporting device includes a specification determination unit which determines the specification of driving support regarding communication of the nonpriority vehicle, and an information processing unit which determines whether or not the transmission of information regarding the nonpriority vehicle is required on the basis of the specification of driving support regarding the communication.

With this aspect, when information regarding the nonpriority vehicle entering the priority road from the nonpriority road is transmitted to the priority vehicle which is traveling on the priority road, the specification of the driving support regarding the communication of the nonpriority vehicle is determined by the specification determination unit, and it is determined by the information processing unit whether or not the transmission of information regarding the nonpriority vehicle is required on the basis of the specification of the driving support regarding the communication. For this reason, for example, only when the nonpriority vehicle cannot receive information from the outside and undergo the driving support, it is possible to transmit information regarding the nonpriority vehicle to the priority vehicle. Therefore, it becomes possible to appropriately support the driving of the priority vehicle which is given priority for traveling.

According to another aspect of the invention, there is provided a driving supporting system which, when a support-target vehicle is traveling on a priority road, supports the driving of the support-target vehicle on the basis of the presence of a nonpriority vehicle entering from a nonpriority road. The driving supporting system includes a vehicle-mounted driving supporting device which is mounted in the support-target vehicle, and a road-installed driving supporting device which is configured to communicate with the support-target vehicle. The road-installed driving supporting device includes a specification determination unit which determines the specification of driving support regarding road-to-vehicle communication of the nonpriority vehicle, and an information processing unit which determines whether or not processing for transmitting information regarding the nonpriority vehicle to the support-target vehicle is required on the basis of the specification of driving support regarding the road-to-vehicle communication. The vehicle-mounted driving supporting device includes a support determination unit which, when information regarding the nonpriority vehicle is received from the road-installed driving device, determines whether or not driving support is required on the basis of whether or not vehicle-to-vehicle communication between the support-target vehicle and the nonpriority vehicle can be performed.

With this aspect, when the support-target vehicle is traveling on the priority road, and when driving support is executed on the support-target vehicle on the basis of the presence of the nonpriority vehicle entering the priority road from the nonpriority road, the specification of driving support regarding the road-to-vehicle communication of the nonpriority vehicle is determined by the specification determination unit of the road-installed driving supporting device, and it is determined by the information processing unit of the road-installed driving supporting device whether or not the transmission of information regarding to the nonpriority vehicle to the support-target vehicle is required on the basis of the specification of driving support regarding the road-to-vehicle communication. When information regarding the nonpriority vehicle is transmitted from the road-installed driving supporting device to the support-target vehicle, it is determined by the support determination unit of the vehicle-mounted driving supporting device whether or not driving support is required on the basis of whether or not the nonpriority vehicle can perform vehicle-to-vehicle communication. For this reason, for example, only when the nonpriority vehicle cannot undergo driving support through road-to-vehicle communication, information regarding the nonpriority vehicle is transmitted to the support-target vehicle, and only when the nonpriority vehicle cannot perform vehicle-to-vehicle communication, it is possible to support the driving of the support-target vehicle. Therefore, it becomes possible to appropriately support the driving of the support-target vehicle which is given priority for traveling.

Advantageous Effects of Invention

According to the invention, it is possible to appropriately support the driving of a priority vehicle which is traveling on a priority road.

REFERENCE SIGNS LIST

Figure 1:
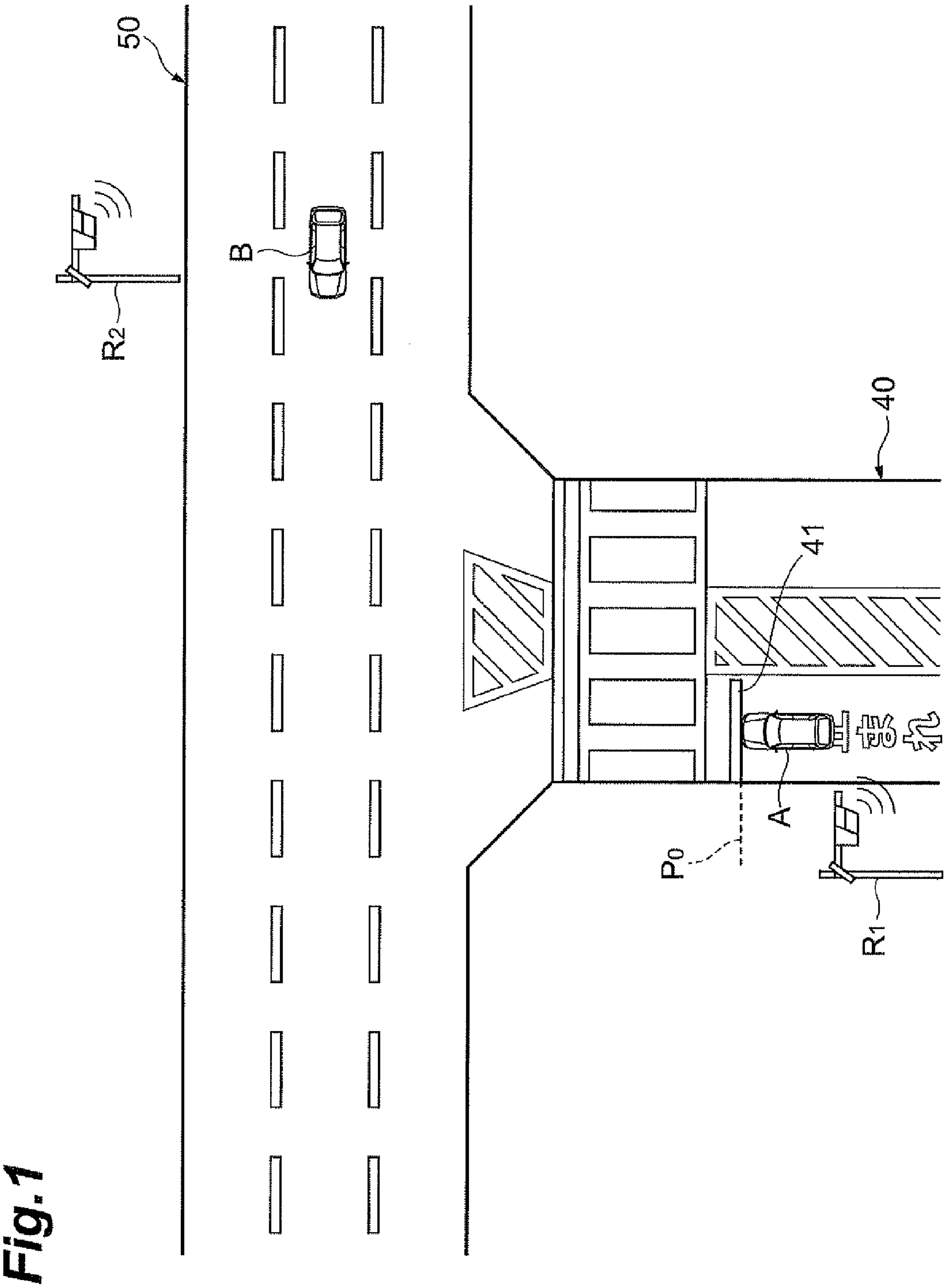
FIG. 1 is a schematic diagram showing the overview of a driving supporting system according to an embodiment.

1: driving supporting system, 2: vehicle-mounted driving supporting device, $R_n$: road-installed driving supporting device, 12*a*, 12*b*: road-installed information processing device (information processing unit), 13*a*: system-mounted determination device (specification determination unit), 33*a*, 33*ab*: vehicle-mounted information processing device, 34: information provision determination device (support determination unit)

Description Of Embodiments

Hereinafter, embodiments of the invention will be described with reference to the accompanying drawings. In the drawings, the same or corresponding portions are represented by the same reference numerals, and overlapping description will be omitted. Unless particularly explicitly shown, description will be provided assuming roads where drivers keep to the left.

(First Embodiment)

A driving supporting system of this embodiment is a system which supports the driving of a vehicle, and is appropriately used, for example, when a support-target vehicle is traveling on a priority road.

First, the configuration of the driving supporting system of this embodiment will be described. FIG. 1 is a schematic diagram illustrating the schematic configuration of a driving supporting system 1 of this embodiment. The driving supporting system 1 of this embodiment includes road-installed driving supporting devices $R_n$ (where n: integer). For example, as shown in FIG. 1, the driving supporting system 1 includes, for example, two road-installed driving supporting devices $R_1$ and $R_2$. The road-installed driving supporting device $R_2$ is disposed on a priority road 50 side where traffic is given priority, and the road-installed driving supporting device $R_1$ is disposed on a nonpriority road 40 which joins the priority road 50. The priority road 50 is a road where traffic is given priority compared to the nonpriority road 40. The nonpriority road 40 is provided with a stop line 41 at a spot $P_0$, for example, before joining the priority road 50 such that traffic of the priority road 50 is given priority.

A priority vehicle B which is traveling on the priority road 50 is a vehicle which is a support target of the driving supporting system 1 of this embodiment, and is configured to undergo infrastructure cooperation driving support from the road-installed driving supporting device $R_2$ through road-to-vehicle communication. Meanwhile, a nonpriority vehicle A which is traveling on the nonpriority road 40 mixedly includes a vehicle which is configured to receive information from the road-installed driving supporting device $R_1$ through road-to-vehicle communication and a vehicle which is configured to receive information from the road-installed driving supporting device $R_1$ through road-to-vehicle communication.

The road-installed driving supporting device $R_1$ has a function of detecting the nonpriority vehicle A which is traveling on the nonpriority road 40 and passes through near the installation spot of the road-installed driving supporting device $R_1$.

When the nonpriority vehicles A are configured to receive information from the road-installed driving supporting devices $R_n$, the road-installed driving supporting device $R_1$ has a function of providing information to the nonpriority vehicles A. The road-installed driving supporting device $R_2$ has a function of detecting the priority vehicle B which is traveling on the priority road 50 and passes through near the installation spot of the road-installed driving supporting device $R_2$, and providing information to the priority vehicle B.

The road-installed driving supporting devices $R_1$ and $R_2$ are configured to perform road-to-road communication. Thus, the road-installed driving supporting device $R_2$ is configured to receive support information (infrastructure cooperation information) regarding driving support from the road-installed driving supporting device $R_1$, and to support the driving of the priority vehicle B, which is traveling on the priority road 50, on the basis of the received infrastructure cooperation information. The infrastructure cooperation information includes information regarding another vehicle. The road-installed driving supporting devices $R_1$ and $R_2$ are configured to communicate with a central management center or the like which distributes road information or traffic information and to receive VICS (Vehicle Information Communication System) information, such as road traffic information, from the central management center.

Figure 2:
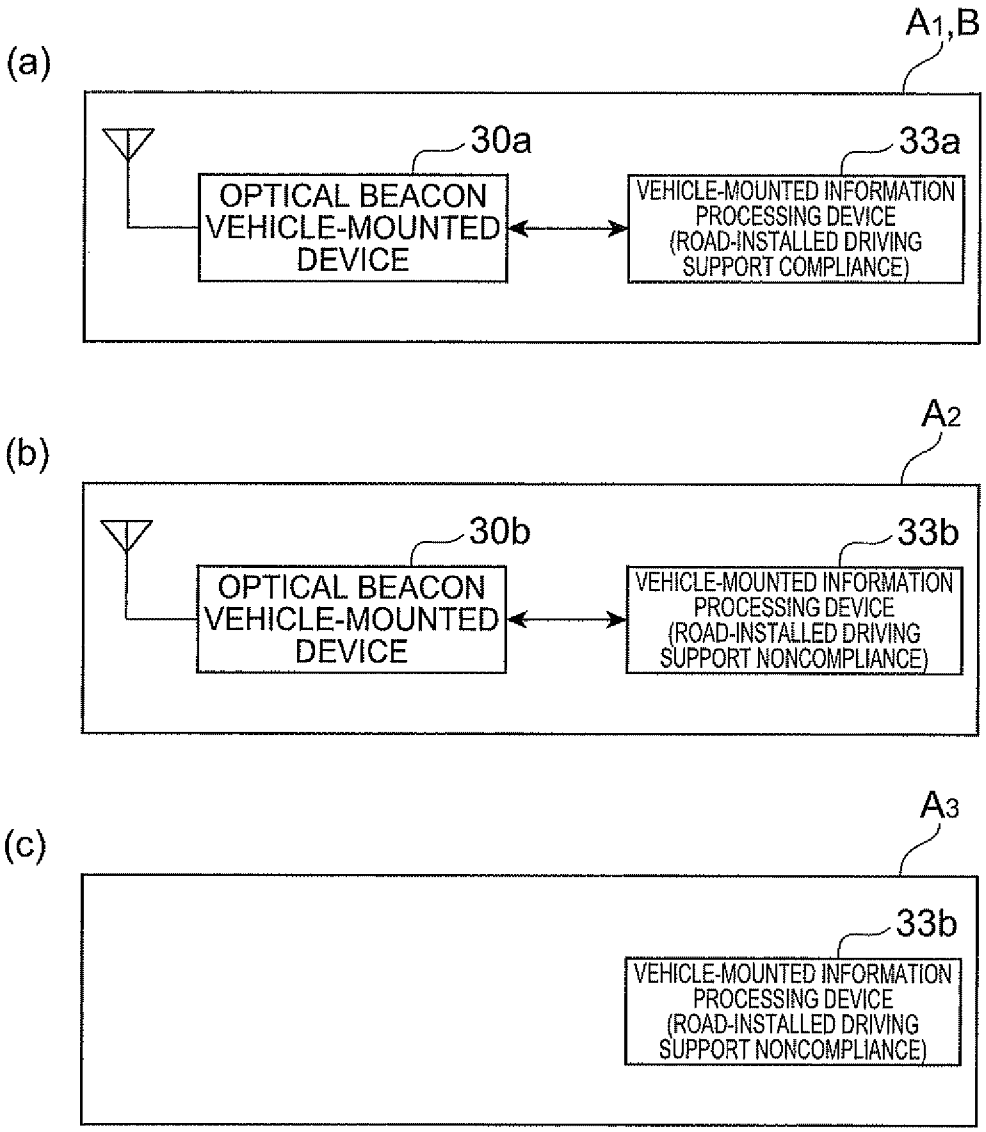
FIG. 2 is a block diagram showing the configuration of a vehicle which is detected or supported by a vehicle-mounted driving system according to a first embodiment.

Next, the configuration of the driving supporting system 1 will be described in detail. First, description will be provided as to the configuration of the priority vehicle B which is a support target of the driving supporting system 1 and the nonpriority vehicle A which is detected by the driving supporting system 1. FIG. 2 is a block diagram showing the configuration of the priority vehicle B which is a support-target vehicle of the driving supporting system 1 and the nonpriority vehicle A which is detected by the driving supporting system 1. FIG. 2(*a*) is a block diagram showing the configuration of the priority vehicle B and a nonpriority vehicle $A_1$. FIG. 2(*b*) is a block diagram showing the configuration of a nonpriority vehicle $A_2$. FIG. 2(*c*) is a block diagram showing the configuration of a nonpriority vehicle $A_3$.

As shown in FIG. 2(*a*), the priority vehicle B includes an optical beacon vehicle-mounted device 30*a* and a vehicle-mounted information processing device 33*a*. The optical beacon vehicle-mounted device 30*a* is configured to communicate with an optical beacon in the road-installed driving supporting device $R_2$. The optical beacon vehicle-mounted device 30*a* is configured to receive VICS information and infrastructure cooperation information, for example, from the road-installed driving supporting device $R_2$ (driving support-compliant optical beacon vehicle-mounted device). The vehicle-mounted information processing device 33*a* includes, for example, a CPU (Central Processing Unit), a memory, such as a ROM (Read Only Memory) or a RAM (Random Access Memory), an input/output interface, and the like. The vehicle-mounted information processing device 33*a* is connected to the optical beacon vehicle-mounted device 30*a*, and has a function of executing infrastructure cooperation driving support on the basis of the infrastructure cooperation information received by the optical beacon vehicle-mounted device 30*a*.

The nonpriority vehicle A has the configuration of one of the nonpriority vehicles $A_1$ to $A_3$ shown in FIGS. 2(*a*) to (*c*). Similarly to the priority vehicle B, the nonpriority vehicle $A_1$ shown in FIG. 2(*a*) is a vehicle which is configured to perform road-to-vehicle communication with the road-installed driving supporting device $R_1$ and can receive VICS information and infrastructure cooperation information. The nonpriority vehicle $A_2$ shown in FIG. 2(*b*) has an optical beacon vehicle-mounted device 30*b* and a vehicle-mounted information processing device 33*b*. The optical beacon vehicle-mounted device 30*b* substantially has the same configuration as the optical beacon vehicle-mounted device 30*a*, but is different from the optical beacon vehicle-mounted device 30*a* in that a function of receiving only VICS information is provided (normal optical beacon vehicle-mounted device). The vehicle-mounted information processing device 33*b* includes, for example, a CPU, a memory, such as a ROM or a RAM, an input/output interface, and the like. The vehicle-mounted information processing device 33*b* is connected to the optical beacon vehicle-mounted device 30*b*, and has a function of executing driving support, such as notification of traffic information, on the basis of the VICS information received by the optical beacon vehicle-mounted device 30*b*. The nonpriority vehicle $A_3$ shown in FIG. 2(*c*) does not have a road-to-vehicle communication function. As described above, the nonpriority vehicle A is one of the nonpriority vehicle $A_1$ which is configured to perform road-to-vehicle communication and to execute infrastructure cooperation driving support, the nonpriority vehicle $A_2$ which is configured to perform road-to-vehicle communication and to execute driving support, such as notification of traffic information, and the nonpriority vehicle $A_3$ which is configured not to perform road-to-vehicle communication. The vehicles have different specifications.

Figure 3:
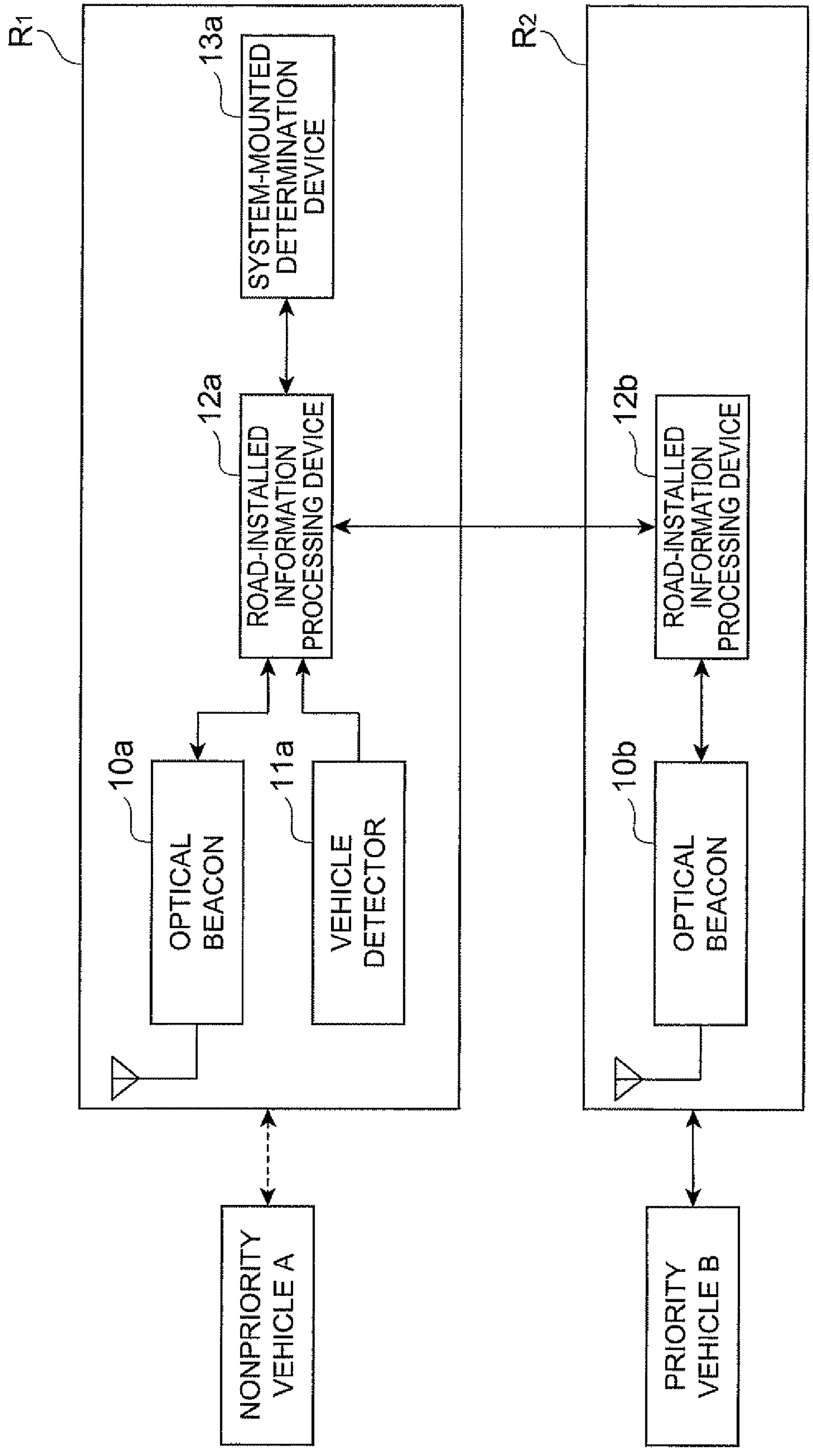
FIG. 3 is a block diagram showing the configuration of a road-installed driving supporting device according to an embodiment.

Next, the configuration of the road-installed driving supporting devices $R_1$ and $R_2$ will be described. FIG. 3 is a block diagram showing the configuration of a road-installed driving supporting device according to a first embodiment. As shown in FIG. 3, the road-installed driving supporting device $R_1$ provided on the nonpriority road 40 side includes, for example, an optical beacon 10*a*, a vehicle detector 11*a*, a road-installed information processing device (information processing unit) 12*a*, and a system-mounted determination device (specification determination unit) 13*a*. The road-installed driving supporting devices $R_1$ and $R_2$, the road-installed information processing device 12*a*, and the system-mounted determination device 13*a* include, for example, a CPU, a memory, such as a ROM or a RAM, an input/output interface, and the like.

The optical beacon 10*a* which is provided in the road-installed driving supporting device $R_1$ has a function of performing road-to-vehicle communication with the optical beacon vehicle-mounted devices 30*a* and 30*b* mounted in the nonpriority vehicles $A_1$ and $A_2$. For example, the optical beacon 10*a* is configured to perform bidirectional communication with the optical beacon vehicle-mounted devices 30*a* and 30*b* mounted in the nonpriority vehicles $A_1$ and $A_2$ using near infrared rays. Communication from the optical beacon vehicle-mounted devices 30*a* and 30*b* to the optical beacon 10*a* is referred to as uplink, and communication from the optical beacon 10*a* to the optical beacon vehicle-mounted devices 30*a* and 30*b* is referred to as downlink. The optical beacon 10*a* is connected to the road-installed information processing device 12*a*, and has a function of outputting uplink information received from the nonpriority vehicles $A_1$ and $A_2$ to the road-installed information processing device 12*a*. The uplink information includes, for example, vehicle information (degree of vehicle, acceleration/deceleration, brake state, accelerator pedal position, turn signal state, hazard state, traveling direction, and the like) of the nonpriority vehicles $A_1$ and $A_2$. The optical beacon 10*a* has a function of transmitting the infrastructure cooperation information output from the road-installed information processing device 12*a* as downlink information to the nonpriority vehicle $A_1$. The infrastructure cooperation information includes information (vehicle information, specification, vehicle ID) regarding the priority vehicle B as another vehicle information, positional information (latitude and longitude) of the road-installed driving supporting device $R_2$ which detects the priority vehicle B as another vehicle, and the like. The vehicle IDs are allocated to the respective vehicles for identification by the road-installed driving supporting devices $R_1$ and $R_2$ at the time of road-to-vehicle communication.

The vehicle detector 11*a* has a function of detecting the presence of the nonpriority vehicle A which is traveling near the installation spot of the road-installed driving supporting device $R_1$. The vehicle detector 11*a* has a function of detecting the nonpriority vehicle A, for example, using ultrasonic waves. The vehicle detector 11*a* is provided to detect the nonpriority vehicle A with no optical beacon vehicle-mounted device. The vehicle detector 11*a* also has a function of outputting the detection result to the road-installed information processing device 12*a*.

The system-mounted determination device 13*a* has a function of determining whether or not an infrastructure cooperation driving supporting system is mounted in the nonpriority vehicle A. For example, the system-mounted determination device 13*a* has a function of acquiring the detection result output from the vehicle detector 11*a* and the uplink information output from the optical beacon 10*a* through the road-installed information processing device 12*a*, and determining whether or not the nonpriority vehicle A as a detection-target vehicle can execute driving support through communication on the basis of the detection result and the uplink information. For example, the system-mounted determination device 13*a* has a function of determining whether or not the nonpriority vehicle A as a detection-target vehicle is the nonpriority vehicle $A_3$ which is configured not to perform road-to-vehicle communication on the basis of the presence/absence of an uplink of the nonpriority vehicle A as a detection-target vehicle. For example, the system-mounted determination device 13*a* has a function of determining whether the nonpriority vehicle A as a detection-target vehicle is the nonpriority vehicle $A_1$ which is configured to execute infrastructure cooperation driving support or the nonpriority vehicle $A_2$ which is configured to execute driving support, such as notification of traffic information, on the basis of the uplink information of the nonpriority vehicle A as a detection-target vehicle. For example, the system-mounted determination device 13*a* has a function of acquiring the specification (specification of driving support) of the nonpriority vehicle A on the basis of the content, form, or the like of the uplink information of the nonpriority vehicle A, and determining whether the nonpriority vehicle A is the nonpriority vehicle $A_1$ or the nonpriority vehicle $A_2$. The specification regarding driving support of the nonpriority vehicle A is, for example, information which represents a receiving function of the nonpriority vehicle A. The receiving function of the nonpriority vehicle A is determined on the basis of whether or not information can be received from an outside information source and whether or not infrastructure cooperation information can be received. The system-mounted determination device 13*a* has a function of outputting the determination result to the road-installed information processing device 12*a*.

The road-installed information processing device 12*a* is connected to the optical beacon 10*a*, the vehicle detector 11*a*, and the system-mounted determination device 13*a*, and is configured to communicate with the road-installed information processing device 12*b* of the road-installed driving supporting device $R_2$. The road-installed information processing device 12*a* has a function of performing processing (road-to-road communication control processing, driving support control processing) regarding infrastructure cooperation driving support. The road-installed information processing device 12*a* has, for example, a function of detecting the nonpriority vehicle A on the basis of the detection result of the vehicle detector 11*a*. The road-installed information processing device 12*a* has a function of acquiring vehicle information of a nonpriority vehicle from the uplink information output from the optical beacon 10*a*. The road-installed information processing device 12*a* has, for example, a function of acquiring the vehicle speed and traveling direction of the nonpriority vehicle $A_3$ on the basis of temporal transition of the position of the nonpriority vehicle $A_3$. The road-installed information processing device 12*a* has a function of determining the danger of collision between the priority vehicle B and the nonpriority vehicle A on the basis of the vehicle information of the priority vehicle B received from the road-installed information processing device 12*b* and the vehicle information of the nonpriority vehicle A. The road-installed information processing device 12*a* has a function of transmitting information regarding the nonpriority vehicle A to the road-installed driving supporting device $R_2$ on the basis of the danger of collision between the nonpriority vehicle A and the priority vehicle B and the determination result of the system-mounted determination device 13*a*. For example, when there is the danger of collision between the nonpriority vehicle A and the priority vehicle B, and the detected nonpriority vehicle A is the nonpriority vehicle $A_2$ or $A_3$ which cannot execute infrastructure cooperation driving support, the road-installed information processing device 12*a* has a function of transmitting information regarding the nonpriority vehicle $A_2$ or $A_3$ to the road-installed driving supporting device $R_2$. The information regarding the nonpriority vehicle $A_2$ or $A_3$ is, for example, vehicle information, the specification (specification regarding driving support (the presence/absence of the driving supporting system), a communication form, or the like), the vehicle ID, positional information (latitude and longitude) of the road-installed driving supporting device $R_1$ which detects the nonpriority vehicle A. The road-installed information processing device 12*a* has a function of outputting the infrastructure cooperation information to the optical beacon 10*a* when the nonpriority vehicle A is the nonpriority vehicle $A_1$ which can execute driving support.

Next, the configuration of the road-installed driving supporting device $R_2$ provided on the priority road 50 side will be described. The road-installed driving supporting device $R_2$ includes an optical beacon 10*b* and a road-installed information processing device 12*b*. The optical beacon 10*b* has the same configuration as the optical beacon 10*a* of the road-installed driving supporting device $R_1$, can perform bidirectional communication with the priority vehicle B, and is configured to transmit the infrastructure cooperation information to the priority vehicle B. The road-installed information processing device 12*b* of the road-installed driving supporting device $R_2$ substantially has the same configuration as the road-installed information processing device 12*a* of the road-installed driving supporting device $R_1$, but is different from the road-installed information processing device 12*a* in that processing is not performed using the determination result of the system-mounted determination device 13*a*. The road-installed information processing device 12*b* has a function of outputting the information (infrastructure cooperation information) regarding the priority vehicle B to the road-installed driving supporting device $R_1$.

Next, the operation of the driving supporting system 1 of this embodiment will be described. First, the operation of the road-installed driving supporting device $R_1$ will be described.

Figure 4:
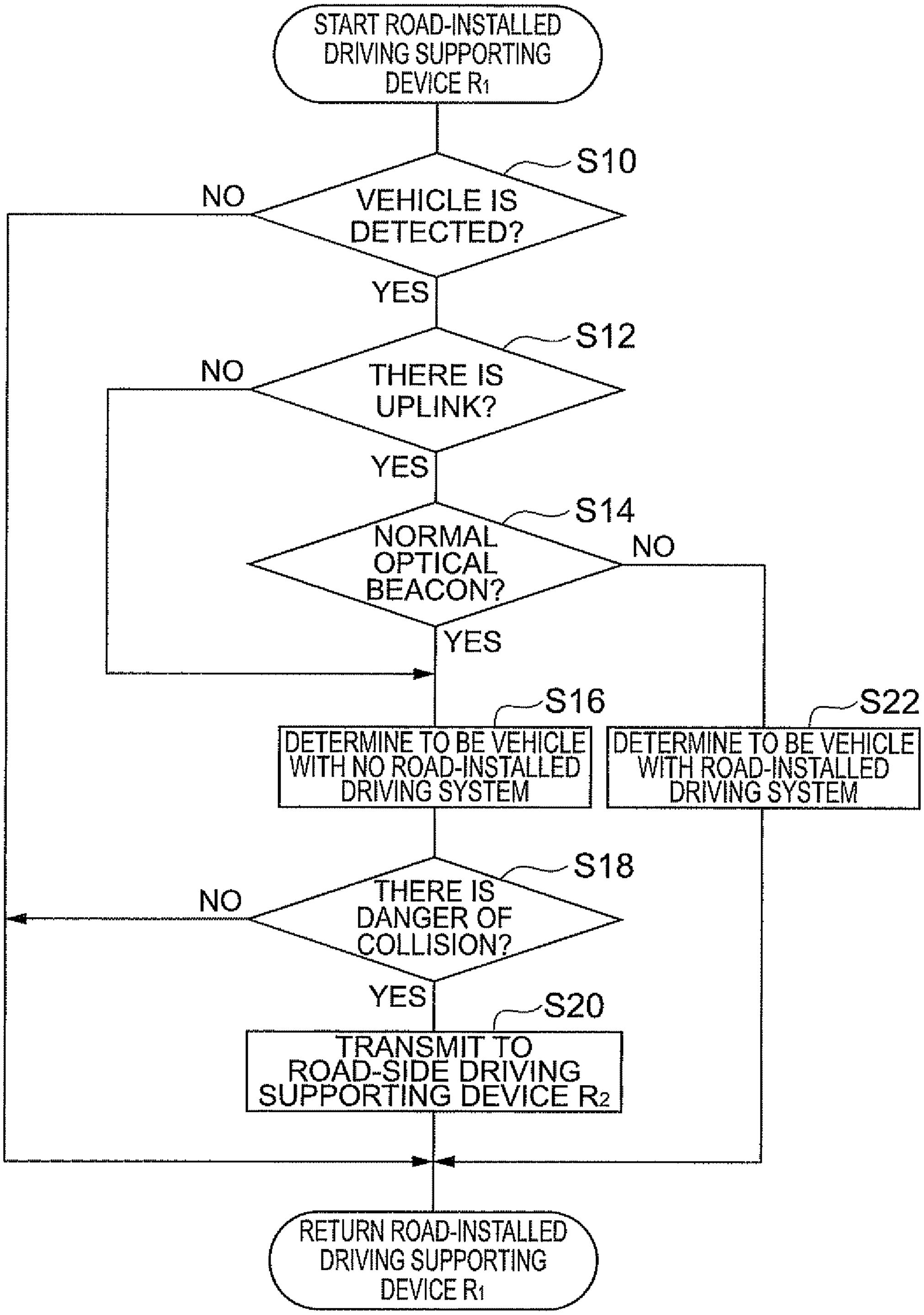
FIG. 4 is a flowchart showing an operation of a road-installed driving supporting device according to the first embodiment which is provided on a nonpriority road side.

FIG. 4 is a flowchart showing the operation of the road-installed driving supporting device $R_1$ provided on the nonpriority road 40 side. Control processing shown in FIG. 4 is repeatedly performed at a predetermined interval, for example, from when the road-installed driving supporting device $R_1$ is powered on.

As shown in FIG. 4, the road-installed driving supporting device $R_1$ starts from vehicle detection processing (S10). The processing of S10 is performed by the road-installed information processing device 12*a* to determine whether or not the nonpriority vehicle A which passes through near the installation spot of the road-installed driving supporting device $R_1$ on the basis of the output result of the vehicle detector 11*a*. In the processing of S10, when it is determined that the nonpriority vehicle A is not detected, the control processing shown in FIG. 4 ends. Meanwhile, in the processing of S10, when it is determined that the nonpriority vehicle A is detected, the processing progresses link determination processing (S12).

The processing of S12 is performed by the system-mounted determination device 13*a* to determine whether or not there is an uplink from the nonpriority vehicle A detected in the processing of S10. In the processing of S12, when there is an uplink from the nonpriority vehicle A, the processing progresses to optical beacon determination processing (S14).

The processing of S14 is performed by the system-mounted determination device 13*a* to determine whether an optical beacon vehicle-mounted device provided in the nonpriority vehicle A is a driving support-compliant optical beacon vehicle-mounted device which is compliant with infrastructure cooperation driving support or a normal optical beacon vehicle-mounted device which is noncompliant with infrastructure cooperation driving support on the basis of the uplink information. The system-mounted determination device 13*a* has a function of determining whether or not an optical beacon is normal on the basis of the content, form, or the like of the uplink information. In the processing of S14, when it is determined that an optical beacon is normal, the processing progresses to system-unmounted determination processing (S16).

The processing of S16 is performed by the system-mounted determination device 13*a* to determine whether or not an infrastructure cooperation driving supporting system is mounted in the nonpriority vehicle A. That is, the system-mounted determination device 13*a* determines that the nonpriority vehicle A is the nonpriority vehicle $A_2$ or $A_3$. If the processing of S16 ends, the processing progresses to danger-of-collision determination processing (S18).

The processing of S18 is performed by the road-installed information processing device 12*a* to determine whether or not there is the danger of collision between the nonpriority vehicle A and the priority vehicle B. For example, the road-installed information processing device 12*a* determines the danger of collision on the basis of the traveling state of the nonpriority vehicle A and the traveling state of the priority vehicle B. For example, the road-installed information processing device 12*a* determines whether or not the nonpriority vehicle A enters the priority road 50 before the priority vehicle B reaches the junction spot of the nonpriority road 40 on the basis of the speed, acceleration, and positions of both vehicles. When the nonpriority vehicle A enters the priority road 50 before the priority vehicle B reaches the junction spot of the nonpriority road 40, and when it is difficult for the priority vehicle B to stop at the stop line 41, the road-installed information processing device 12 determines that there is the danger of collision on the basis of the vehicle speed of the nonpriority vehicle A. In the processing of S18, when it is determined that there is the danger of collision, the processing progresses to road-to-road communication processing (S20).

The processing of S20 is performed by the road-installed information processing device 12*a* to transmit the infrastructure cooperation information regarding the nonpriority vehicle A to the road-installed driving supporting device $R_2$. If the processing of S20 ends, the control processing shown in FIG. 4 ends.

Meanwhile, in the processing of S12, when there is no uplink information, the processing progresses to the processing of S16, and it is determined that an infrastructure cooperation driving supporting system is not mounted in the nonpriority vehicle A.

In the processing of S14, when it is determined that an optical beacon is not normal, the processing progresses to system-mounted determination processing (S22). The processing of S22 is performed by the system-mounted determination device 13*a* to determine whether or not an infrastructure cooperation driving supporting system is mounted in the nonpriority vehicle A. That is, the system-mounted determination device 13*a* determines that the nonpriority vehicle A is the nonpriority vehicle $A_1$. If the processing of S22 ends, while information regarding the nonpriority vehicle A is not transmitted to the road-installed driving supporting device $R_2$, the control processing shown in FIG. 4 ends.

In the processing of S18, when it is determined that there is no danger of collision, the control processing shown in FIG. 4 ends.

With the above, the control processing shown in FIG. 4 ends. If the control processing shown in FIG. 4 is performed, while infrastructure support information regarding the nonpriority vehicle $A_1$ which can execute infrastructure cooperation driving support is not transmitted to the road-installed driving supporting device $R_2$, infrastructure support information regarding the nonpriority vehicles $A_2$ and $A_3$ which cannot execute infrastructure cooperation driving support is transmitted to the road-installed driving supporting device $R_2$.

Figure 5:
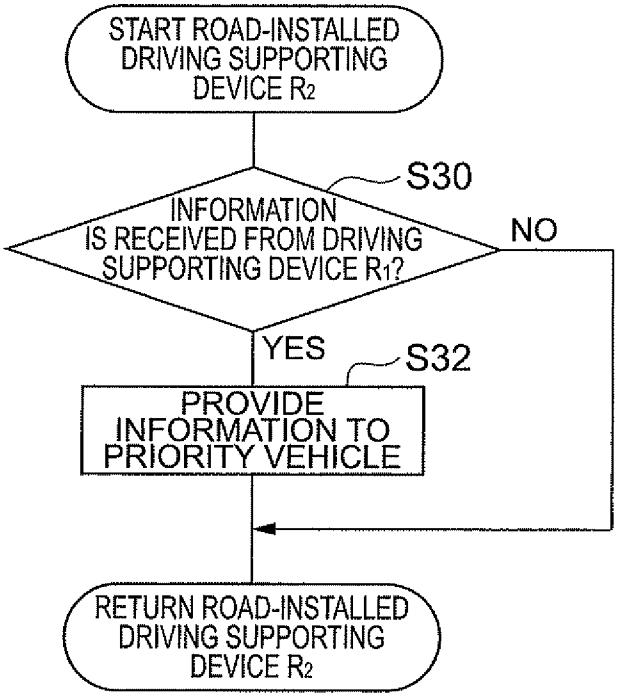
FIG. 5 is a flowchart showing an operation of a road-installed driving supporting device according to the first embodiment which is provided on a priority road side.

Next, the operation of the road-installed driving supporting device $R_2$ will be described. FIG. 5 is a flowchart showing the operation of the road-installed driving supporting device $R_2$ provided on the priority road 50 side. Control processing shown in FIG. 5 is repeatedly performed at a predetermined interval, for example, from when the road-installed driving supporting device $R_2$ is powered on.

As shown in FIG. 5, the road-installed driving supporting device $R_2$ starts from reception processing (S30). The processing of S10 is performed by the road-installed information processing device 12*b* to determine whether or not infrastructure cooperation information is received from the road-installed driving supporting device $R_1$. In the processing of S30, when it is determined that infrastructure cooperation information is received from the road-installed driving supporting device $R_1$, the processing progresses to information provision processing (S32).

The processing of S32 is performed by the system-mounted determination device 13*b* and the optical beacon vehicle-mounted device 30*a* to provide infrastructure emphasis information received in the processing of S30 to the priority vehicle B. If the processing of S32 ends, the control processing shown in FIG. 5 ends.

Meanwhile, in the processing of S30, when it is determined that infrastructure cooperation information cannot be received from the road-installed driving supporting device $R_1$, the control processing shown in FIG. 5 ends.

With the above, the control processing shown in FIG. 5 ends. If the control processing shown in FIG. 5 is performed, while infrastructure support information regarding the nonpriority vehicle $A_1$ which can execute infrastructure cooperation driving support is not transmitted to the priority vehicle B, only infrastructure support information regarding the nonpriority vehicles $A_2$ and $A_3$ which cannot execute infrastructure cooperation driving support is transmitted to the priority vehicle B. For this reason, it is possible to appropriately discriminate the nonpriority vehicles $A_2$ and $A_3$ with no means for avoiding collision against another vehicle using the infrastructure support information and to provide only the nonpriority vehicles $A_2$ and $A_3$, which has the danger of collision, to the priority vehicle B. For this reason, it is possible to avoid information from being frequently provided to the priority vehicle B, making it possible to reduce a feeling of bothered of the driver. According to a driving supporting system of the related art, the nonpriority vehicle $A_2$ and $A_3$ which cannot execute infrastructure cooperation driving support cannot be detected, and as a result, even in a scene where the priority vehicle B should avoid collision against the nonpriority vehicle A, a notification to the priority vehicle B cannot be made. In contrast, according to the driving supporting system 1 of this embodiment, the nonpriority vehicle $A_3$ which cannot execute infrastructure cooperation driving support can be notified to the priority vehicle B. For this reason, the driving supporting system 1 can provide information beneficial to the driver. Usually, the priority vehicle B should be given priority for traveling compared to the nonpriority vehicle A, and it is appropriate that collision avoidance is executed on the nonpriority vehicle A side. For this reason, it is possible to avoid excessive support to the priority vehicle B side, making it possible to avoid a false belief that, when a vehicle becomes the nonpriority vehicle A, the priority vehicle B will avoid danger.

As described above, according to the driving supporting system 1 and the road-installed driving supporting devices $R_1$ and $R_2$ of the first embodiment, when the information regarding the nonpriority vehicle A entering the priority road 50 from the nonpriority road 40 is transmitted to the priority vehicle B which is traveling on the priority road 50, the specification of driving support regarding communication of the nonpriority vehicle A is determined by the system-mounted determination device 13*a* of the road-installed driving supporting device $R_1$ provided on the nonpriority road 40 side, and it is determined by the road-installed information processing device 12*a* whether or not the transmission of the information regarding the nonpriority vehicle A is required on the basis of the specification of driving support regarding the communication. For this reason, only when the nonpriority vehicle A cannot receive information from the outside and undergo driving support, the information regarding the nonpriority vehicle A can be transmitted to the priority vehicle B. Therefore, it becomes possible to appropriate support the driving of the priority vehicle B which is given priority for traveling.

(Second Embodiment)

A driving supporting system according to a second embodiment substantially has the same configuration as the driving supporting system 1 according to the first embodiment, and is different from the driving supporting system 1 according to the first embodiment in that it is determined whether or not driving support is executed on the priority vehicle B side. In the second embodiment, description of the portions which overlap the portions in the first embodiment will be omitted, and only a difference will be described.

The driving supporting system of this embodiment includes the road-installed driving supporting devices $R_1$ and $R_2$ according to the first embodiment, and a vehicle-mounted driving supporting device 2 mounted in a support-target vehicle. As in the first embodiment, a case will be described where the support-target vehicle is traveling on the priority road 50, that is, the support-target vehicle is the priority vehicle B.

Figure 6:
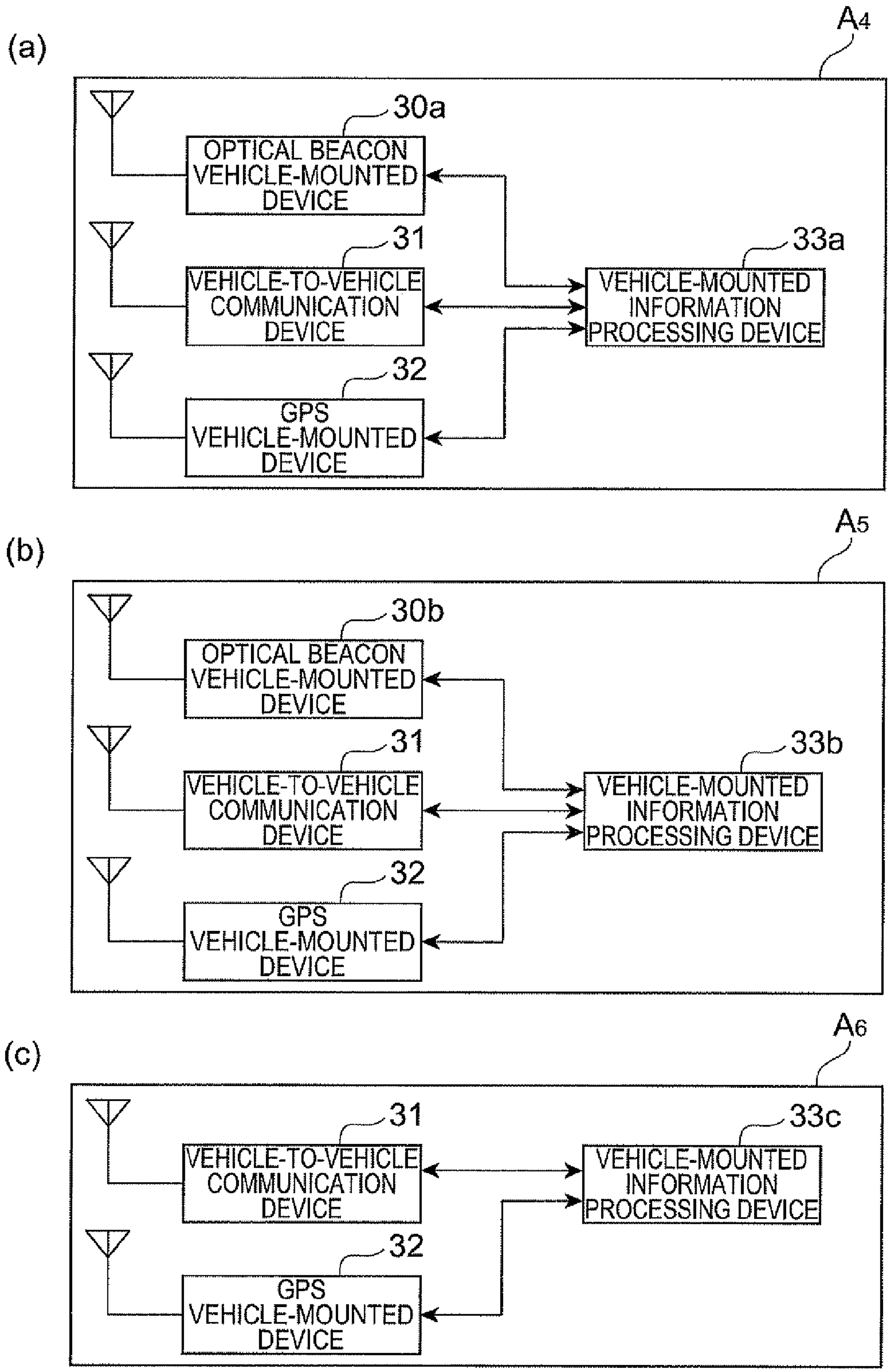
FIG. 6 is a block diagram showing the configuration of a vehicle which is detected by a vehicle-mounted driving system according to a second embodiment.

First, the configuration of the nonpriority vehicle A which is a detection target of the driving supporting system of this embodiment will be described. The nonpriority vehicle A can have the configuration of each of the nonpriority vehicles $A_1$ to $A_3$ shown in FIGS. 2(*a*) to (*c*) or the configuration of each of nonpriority vehicles $A_4$ to $A_6$ shown in FIGS. 6(*a*) to (*c*). The nonpriority vehicles $A_1$ to $A_3$ are the same as described in the first embodiment, thus description thereof will be omitted. FIG. 6 is a schematic diagram showing an example of the configuration of the nonpriority vehicle A. The nonpriority vehicle $A_4$ shown in FIG. 6(*a*) substantially has the same configuration as the nonpriority vehicle $A_1$ shown in FIG. 2(*a*), and is different from the nonpriority vehicle $A_1$ in that a vehicle-to-vehicle communication device 31 and a GPS (Global Positioning System) vehicle-mounted device 32 are further provided, and part of the functions of a vehicle-mounted information processing device 33*a* is different.

The vehicle-to-vehicle communication device 31 has a function of performing communication with another vehicle therearound. The vehicle-to-vehicle communication device 31 is connected to the vehicle-mounted information processing device 33*a*. The vehicle-to-vehicle communication device 31 has a function of receiving vehicle-to-vehicle support information including information regarding another vehicle from another vehicle through vehicle-to-vehicle communication, and outputting the vehicle-to-vehicle support information to the vehicle-mounted information processing device 33*a*. The vehicle-to-vehicle communication device 31 has a function of transmitting vehicle-to-vehicle support information including information regarding a host vehicle output from the vehicle-mounted information processing device 33*a* to another vehicle.

The GPS vehicle-mounted device 32 has a function of receiving GPS information which is positional information of the host vehicle. The GPS is a measurement system using satellites, and is suitably used to recognize the current position of the host vehicle. The GPS vehicle-mounted device 32 has a function of outputting the received GPS information to the vehicle-mounted information processing device 33*a*.

The vehicle-mounted information processing device 33*a* substantially has the same configuration as the vehicle-mounted information processing device 33*a* described in the first embodiment, and is different from the vehicle-mounted information processing device 33*a* described in the first embodiment in that a function of executing driving support on the basis of the vehicle-vehicle support information output from the vehicle-to-vehicle communication device 31 is further provided.

As described above, the nonpriority vehicle $A_4$ is a vehicle which configured to perform road-to-vehicle communication with the road-installed driving supporting device $R_1$, to receive VICS information and infrastructure cooperation information, to perform vehicle-to-vehicle communication with another vehicle, and to transmit and receive vehicle-to-vehicle support information.

The nonpriority vehicle $A_5$ shown in FIG. 6(*b*) substantially has the same configuration as the nonpriority vehicle $A_2$ shown in FIG. 2(*b*), and is different from the nonpriority vehicle $A_2$ in that a vehicle-to-vehicle communication device 31 and a GPS vehicle-mounted device 32 are further provided, and part of the functions of the vehicle-mounted information processing device 33*b* is different. The vehicle-mounted information processing device 33*b* substantially has the same configuration as the vehicle-mounted information processing device 33*b* described in the first embodiment, and is different from the vehicle-mounted information processing device 33*b* described in the first embodiment in that a function of executing driving support on the basis of vehicle-to-vehicle support information output from the vehicle-to-vehicle communication device 31 is further provided. As described above, the vehicle $A_5$ is a vehicle which is configured to perform road-to-vehicle communication with the road-installed driving supporting device $R_1$, to receive VICS information, to perform vehicle-to-vehicle communication with another vehicle, and to transmit and receive vehicle-to-vehicle support information.

The nonpriority vehicle $A_6$ shown in FIG. 6(*c*) includes a vehicle-to-vehicle communication device 31, a GPS vehicle-mounted device 32, and a vehicle-mounted information processing device 33*c*. The vehicle-mounted information processing device 33*c* has a function of executing driving support on the basis of vehicle-to-vehicle support information output from the vehicle-to-vehicle communication device 31. That is, the vehicle $A_6$ is a vehicle which is configured to perform vehicle-to-vehicle communication with another vehicle, and to transmit and receive vehicle-to-vehicle support information.

As described above, the nonpriority vehicle A is one of the nonpriority vehicle $A_1$ which is configured to perform road-to-vehicle communication and to execute infrastructure cooperation driving support, the nonpriority vehicle $A_2$ which is configured to perform road-to-vehicle communication and to execute driving support, such as notification of traffic information, the nonpriority vehicle $A_3$ which is configured not to perform road-to-vehicle communication, the nonpriority vehicle $A_4$ which is configured to perform road-to-vehicle communication and vehicle-to-vehicle communication, and to execute infrastructure cooperation driving support and vehicle-to-vehicle driving support, the nonpriority vehicle $A_5$ which is configured to perform road-to-vehicle communication and vehicle-to-vehicle communication, and to execute driving support, such as notification of traffic information, and vehicle-to-vehicle driving support, and the nonpriority vehicle $A_6$ which is configured to perform vehicle-to-vehicle communication and to execute vehicle-to-vehicle driving support. The vehicles have different specifications.

Figure 7:
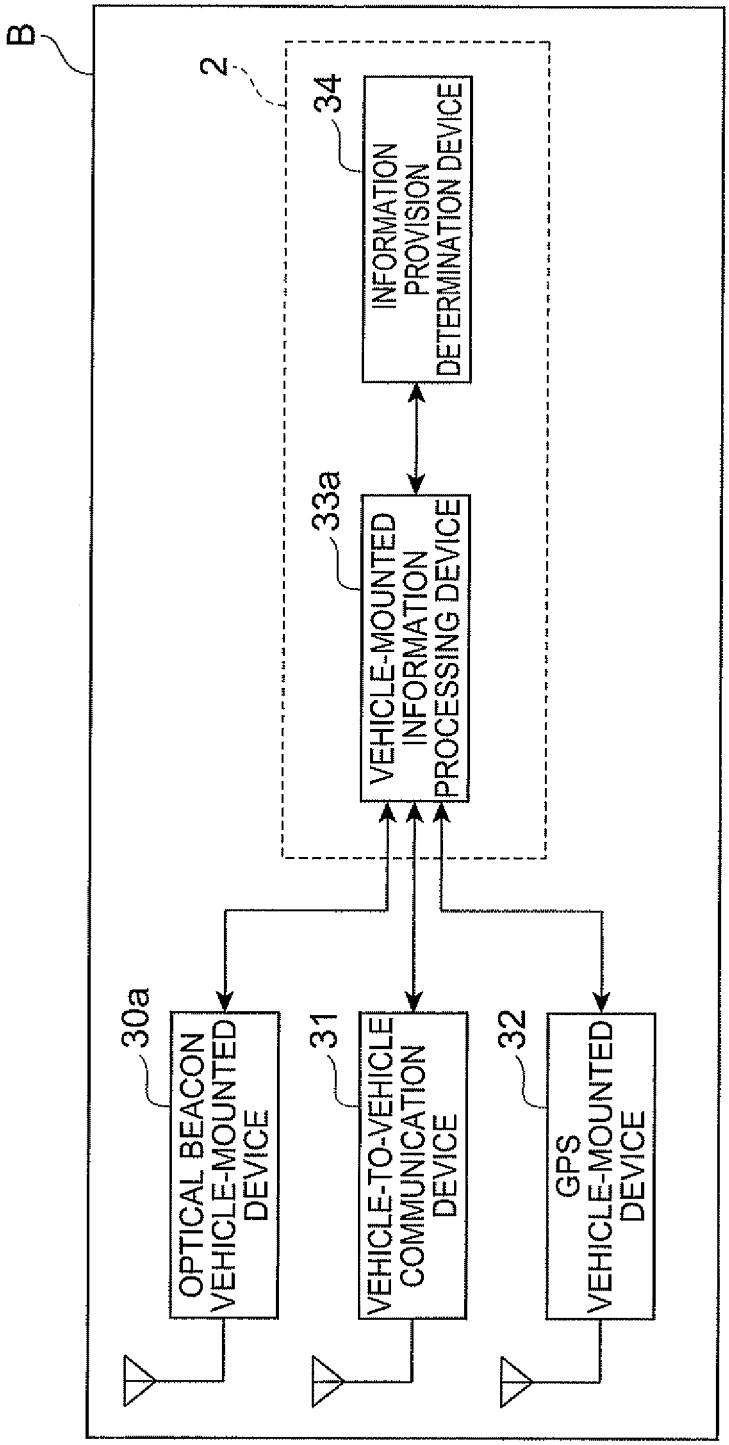
FIG. 7 is a block diagram showing the configuration of a vehicle including a vehicle-mounted driving supporting device according to the second embodiment.

Next, the configuration of a support-target vehicle which includes the vehicle-mounted driving supporting device 2 according to the second embodiment will be described. FIG. 7 is a block diagram showing the configuration of a support-target vehicle which includes the vehicle-mounted driving supporting device 2 according to the second embodiment. For the viewpoint of ease of understanding of description, a case will be described where a support-target vehicle is traveling on the priority road 50, that is, a support-target vehicle becomes the priority vehicle B.

As shown in FIG. 7, the support-target vehicle (priority vehicle B) substantially has the same configuration as the priority vehicle B shown in FIG. 2(*a*), and is different from the priority vehicle B described in the first embodiment in that a vehicle-to-vehicle communication device 31, a GPS vehicle-mounted device 32, and an information provision determination device (support determination unit) 34 are further provided, and part of the functions of a vehicle-mounted information processing device 33*a* is different.

The information provision determination device 34 includes, for example, a CPU, a memory, such s a ROM or a RAM, an input/output interface, and the like. The information provision determination device 34 has a function of determining whether or not to execute infrastructure cooperation driving support. For example, the information provision determination device 34 has a function of determining whether or not a driving supporting system using vehicle-to-vehicle support information is mounted in the nonpriority vehicle A. For example, the information provision determination device 34 has a function of acquiring infrastructure cooperation information output from the optical beacon vehicle-mounted device 30*a*, information regarding the nonpriority vehicle A output from the vehicle-to-vehicle communication device 31, and positional information of the priority vehicle B output from the GPS vehicle-mounted device 32 through the vehicle-mounted information processing device 33*a*, and determining whether or not the nonpriority vehicle A performs vehicle-to-vehicle communication. The information provision determination device 34 has a function of determining whether or not a driving supporting system using support information acquired through vehicle-to-vehicle communication is mounted in the nonpriority vehicle A when the nonpriority vehicle A indicated by infrastructure cooperation information can perform vehicle-to-vehicle communication. The information provision determination device 34 has a function of determining whether or not to execute infrastructure cooperation driving support on the basis of whether or not a driving supporting system using support information acquired through vehicle-to-vehicle communication is mounted in the nonpriority vehicle A. The information provision determination device 34 has a function of outputting a determination result on whether or not to execute infrastructure cooperation driving support to the vehicle-mounted information processing device 33*a*.

The vehicle-mounted information processing device 33*a* substantially has the same configuration as the vehicle-mounted information processing device 33*a* described in the first embodiment, and is different from the vehicle-mounted information processing device 33*a* described in the first embodiment in that a function of executing driving support on the basis of vehicle-to-vehicle support information output from the vehicle-to-vehicle communication device 31 is further provided, and a function of switching infrastructure cooperation driving support and driving support through vehicle-to-vehicle communication on the basis of the determination result output from the information provision determination device 34 is further provided.

The vehicle-mounted driving supporting device 2 includes the above-described vehicle-mounted information processing device 33*a* and the information provision determination device 34.

Figure 8:
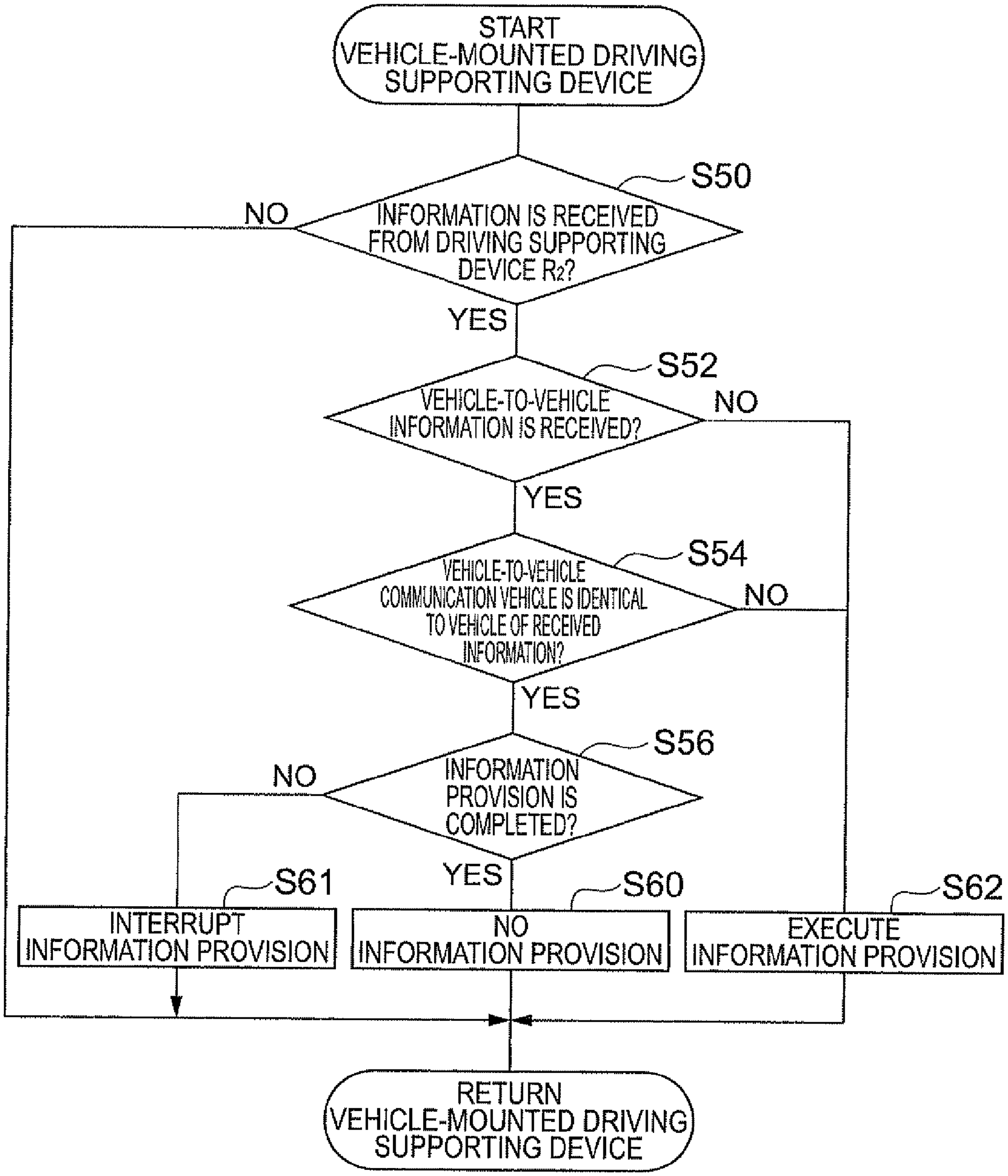
FIG. 8 is a flowchart showing an operation of a vehicle-mounted driving supporting device according to the second embodiment.

Next, the operation of the vehicle-mounted driving supporting device 2 of this embodiment will be described. FIG. 8 is a flowchart showing the operation of the vehicle-mounted driving supporting device 2 of this embodiment. Control processing shown in FIG. 8 is repeatedly performed at a predetermined interval, for example, from when the vehicle-mounted driving supporting device 2 is powered on.

As shown in FIG. 8, the vehicle-mounted driving supporting device 2 starts from road-to-vehicle reception determination processing (S50). The processing of S50 is performed by the vehicle-mounted information processing device 33*a* to determine whether or not infrastructure cooperation information is received from the road-installed driving supporting device $R_2$. It is assumed that the road-installed driving supporting devices $R_1$ and $R_2$ perform the control processing shown in FIGS. 4 and 5, and outputs information (infrastructure cooperation information) regarding the nonpriority vehicle A. Since the nonpriority vehicles $A_1$ and $A_4$ can undergo driving support on the basis of the infrastructure cooperation information, in the processing of S50, the nonpriority vehicles $A_1$ and $A_4$ do not have the configuration which is represented by the infrastructure cooperation information. Thus, in the following description, the configuration of the nonpriority vehicle A which is represented by the infrastructure cooperation information is the configuration of one of the nonpriority vehicles $A_2$, $A_3$, $A_5$, and $A_6$. In the processing of S50, when it is determined that the infrastructure cooperation information is not received from the road-installed driving supporting device $R_2$, the control processing shown in FIG. 8 ends. Meanwhile, in the processing of S50, when it is determined that the infrastructure cooperation information is received from the road-installed driving supporting device $R_2$, the processing progresses to vehicle-to-vehicle reception determination processing (S52).

The processing of S52 is performed by the vehicle-mounted information processing device 33*a* to determine whether or not information regarding another vehicle is received through vehicle-to-vehicle communication. In the processing of S52, when it is determined that information regarding another vehicle is received through vehicle-to-vehicle communication, the processing progresses to information provision processing (S62).

The processing of S62 is performed by the vehicle-mounted information processing device 33*a* to provide information regarding the nonpriority vehicle A to the driver of the priority vehicle B on the basis of the infrastructure cooperation information received in the processing of S50. If the processing of S62 ends, the control processing shown in FIG. 8 ends. Thus, when the nonpriority vehicle A is the nonpriority vehicle $A_2$ or $A_3$ which cannot perform vehicle-to-vehicle communication, information regarding the nonpriority vehicle A is provided to the priority vehicle B by driving support based on the infrastructure cooperation information.

Meanwhile, in the processing of S52, when it is determined that information regarding another vehicle is received through vehicle-to-vehicle communication, the processing progresses to identicalness determination processing (S54). The processing of S54 is performed by the information provision determination device 34 to determine whether or not the nonpriority vehicle A which is represented by the infrastructure cooperation information is identical to another vehicle which performs communication through vehicle-to-vehicle communication. In this case, the nonpriority vehicle A is the nonpriority vehicles $A_5$ or $A_6$.

Hereinafter, the identicalness determination processing of S54 will be described in detail. With regard to the identicalness determination processing, for example, there are three methods.

First, an example will be described where vehicle identicalness is determined using vehicle IDs. Since the determination is predicated on road-to-vehicle communication, when the nonpriority vehicle A is the nonpriority vehicle $A_5$, the determination can be executed. When performing road-to-vehicle communication with the nonpriority vehicle A, the road-installed driving supporting device $R_1$ determines a vehicle ID which uniquely specifies the nonpriority vehicle A, and transmits downlink information including the vehicle ID to the nonpriority vehicle A. The nonpriority vehicle A records the received vehicle ID, for example, in a vehicle-mounted memory. The road-installed driving supporting device $R_1$ transmits infrastructure cooperation information including the vehicle ID to the road-installed driving supporting device $R_2$. The road-installed driving supporting device $R_2$ transmits the infrastructure support information including the vehicle ID to the priority vehicle B. The priority vehicle B records the vehicle ID included in the received infrastructure cooperation information, for example, in a vehicle-mounted memory. Thus, the nonpriority vehicle A and the priority vehicle B share the vehicle ID which uniquely specifies the nonpriority vehicle A. The nonpriority vehicle A transmits vehicle-to-vehicle support information including a vehicle ID. When the vehicle ID included in the received vehicle-to-vehicle support information is identical to the vehicle ID included in the infrastructure cooperation information, the priority vehicle B determines that the nonpriority vehicle A which is notified by the infrastructure cooperation information and a vehicle which performs vehicle-to-vehicle communication.

Next, an example will be described where vehicle identicalness is determined using vehicle information. Since the determination is predicated on road-to-vehicle communication, when the nonpriority vehicle A is the nonpriority vehicle $A_5$, the determination can be executed. When performing road-to-vehicle communication with the road-installed driving supporting device $R_1$, the nonpriority vehicle A transmits uplink information including vehicle information (degree of vehicle, acceleration/deceleration, brake state, accelerator pedal position, turn signal state, hazard sate, traveling direction, and the like) to the road-installed driving supporting device $R_1$. The road-installed driving supporting device $R_1$ transmits infrastructure cooperation information including all or a part of vehicle information of the nonpriority vehicle A and positional information (latitude and longitude) of the road-installed driving supporting device $R_1$ is transmitted to the road-installed driving supporting device $R_2$. The road-installed driving supporting device $R_2$ transmits the infrastructure support information to the priority vehicle B. The priority vehicle B records all or a part of the vehicle information of the nonpriority vehicle A included in the received infrastructure cooperation information and the positional information of the road-installed driving supporting device $R_1$, for example, in a vehicle-mounted memory. The nonpriority vehicle A transmits vehicle-to-vehicle support information including all or a part of vehicle information and positional information (for example, GPS information) of a host vehicle. When all or a part of the vehicle information included in the received vehicle-to-vehicle support information and the positional information are identical to all or a part of the vehicle information included in the infrastructure cooperation information and the positional information, the priority vehicle B determines that the nonpriority vehicle A which is notified by the infrastructure cooperation information is identical to a vehicle which performs vehicle-to-vehicle communication.

Next, an example will be described where vehicle identicalness is determined using positional information. The road-installed driving supporting device $R_1$ detects the speed and orientation of the nonpriority vehicle A, and transmits infrastructure cooperation information including the speed, the orientation, and positional information of the road-installed driving supporting device $R_1$ to the road-installed driving supporting device $R_2$. The road-installed driving supporting device $R_2$ transmits the infrastructure support information to the priority vehicle B. When performing vehicle-to-vehicle communication with the priority vehicle B, the nonpriority vehicle A transmits vehicle-to-vehicle support information including the speed, orientation, and positional information thereof to the priority vehicle B. The priority vehicle B records all or a part of the vehicle information of the nonpriority vehicle A included in the received infrastructure cooperation information and the positional information of the road-installed driving supporting device $R_1$, for example, in a vehicle-mounted memory. When the speed, orientation, and positional information included in the received vehicle-to-vehicle support information are identical to the speed, orientation, and positional information included in the infrastructure cooperation information, the priority vehicle B determines that the nonpriority vehicle A which is notified by the infrastructure cooperation information is identical to a vehicle which performs vehicle-to-vehicle communication.

In the identicalness determination processing of S54, when it is determined that the nonpriority vehicle A which is notified by the infrastructure cooperation information is identical to a vehicle which performs vehicle-to-vehicle communication, the processing progresses to information provision start determination processing (S56).

The processing of S56 is performed by the vehicle-mounted information processing device 33*a* to determine whether or not driving support regarding the nonpriority vehicle A is already executed on the basis of the infrastructure cooperation information. In the processing of S56, when it is determined that information provision is not executed yet, information provision is not executed, and the control processing shown in FIG. 8 ends (S60). Meanwhile, in the processing of S56, when it is determined that information provision is already executed, information provision is interrupted, and the control processing shown in FIG. 8 ends (S58).

With the above, the control processing shown in FIG. 8 ends. If the control processing shown in FIG. 8 is performed, when the nonpriority vehicle A is one of the nonpriority vehicles $A_4$ to $A_6$ which can perform vehicle-to-vehicle communication, that is, when driving support regarding the priority vehicle B is executed on the nonpriority vehicle A side through vehicle-to-vehicle communication, it is possible to avoid information regarding the nonpriority vehicle A from being notified to the priority vehicle B. Therefore, it is possible to avoid unnecessary information from being provided to the driver of the priority vehicle B.

As described above, according to the vehicle-mounted driving supporting device 2 of the second embodiment, when driving support is executed depending on the presence of the nonpriority vehicle A entering the priority road 50 from the nonpriority road 40 during traveling on the priority road 50, the receiving function of the nonpriority vehicle is recognized by the information provision determination device 34 on the basis of the specification regarding driving support of the nonpriority vehicle A received from the outside, thereby determining whether or not driving support is required. For this reason, for example, only when the nonpriority vehicle A cannot receive information regarding driving support from the outside, driving support can be executed. Therefore, it becomes possible to appropriately support the driving of the host vehicle which is the priority vehicle B.

According to the vehicle-mounted driving supporting device 2 of the second embodiment, it is determined by the information provision determination device 34 whether or not driving support is required on the basis of whether or not the nonpriority vehicle A can perform vehicle-to-vehicle communication. For this reason, for example, it is possible to avoid driving support from being executed depending on the presence of the nonpriority vehicle A which can detect the presence of the priority vehicle B through vehicle-to-vehicle communication. Therefore, it becomes possible to appropriately support the driving of the host vehicle which is the priority vehicle B.

According to the driving supporting system of the second embodiment, when the support-target vehicle is traveling on the priority road 50, and when the driving of the support-target vehicle is supported depending on the presence of the nonpriority vehicle A entering the priority road 50 from the nonpriority road 40, the specification of driving support regarding road-to-vehicle communication of the nonpriority vehicle A is determined by the system-mounted determination device 13*a* of the road-installed driving supporting device $R_1$, and it is determined by the road-installed information processing device 12*a* of the road-installed driving supporting device $R_1$ whether or not the transmission of information regarding the nonpriority vehicle A to the support-target vehicle is required on the basis of the specification of driving support regarding road-to-vehicle communication. When information regarding the nonpriority vehicle A is transmitted from the road-installed driving supporting device $R_1$ to the support-target vehicle, it is determined by the information provision determination device 34 of the vehicle-mounted driving supporting device 2 whether or not driving support is required on the basis of whether or not the nonpriority vehicle A can perform vehicle-to-vehicle communication. For this reason, for example, only when the nonpriority vehicle A cannot undergo driving support through road-to-vehicle communication, information regarding the nonpriority vehicle A is transmitted to the support-target vehicle. Only when the nonpriority vehicle A cannot perform vehicle-to-vehicle communication, driving support to the support-target vehicle can be executed. Therefore, it becomes possible to appropriately support the driving of the support-target vehicle which is given priority for traveling.

The above-described embodiments are examples of the driving supporting system, the road-installed driving supporting devices $R_n$, and the vehicle-mounted driving supporting device according to the invention. The driving supporting system, the road-installed driving supporting devices $R_n$, and the vehicle-mounted driving supporting device according to the invention are not limited to the driving supporting system, the road-installed driving supporting devices $R_n$, and the vehicle-mounted driving supporting device of the embodiments, and the driving supporting system, the road-installed driving supporting devices $R_n$, and the vehicle-mounted driving supporting device may be modified or may be applied to others without departing from the scope and spirit of the invention described in the appended claims.

For example, although in the above-described first embodiment, an example has been described where the road-installed driving supporting device $R_1$ includes the system-mounted determination device 13*a*, any of the road-installed driving supporting devices $R_n$ may be provided. For example, the road-installed driving supporting device $R_2$ provided on the priority road 50 side may be provided. The system-mounted determination device 13*a* may be provided on the support-target vehicle side. In this case, it is determined whether or not driving support is required on the basis of whether or not the nonpriority vehicle A can acquire information regarding the priority vehicle B from the optical beacon. For this reason, for example, with regard to the nonpriority vehicle A which undergoes driving support depending on the presence of the priority vehicle B, it is possible to avoid driving support from being executed on the priority vehicle B. Therefore, it becomes possible to appropriately support the driving of the host vehicle which is the priority vehicle B.

Although in the above-described embodiments, an example has been described when road-to-vehicle communication using an optical beacon is performed, road-to-vehicle communication using electrical waves may be performed.

Although in the above-described embodiments, an example has been described where a head-on traffic scene is supported, the invention is not limited thereto. For example, the invention is suitably used when driving support is executed on a vehicle which is traveling in a straight line on the basis of the presence of a vehicle which turns right, or when one is given priority and driving support is executed on the one which is given priority, such as wraparound prevention at the time of left turn, rear-end collision, or pedestrian support.

The invention claimed is:

1. A vehicle-mounted driving supporting device which supports driving depending on the presence of a nonpriority vehicle entering a priority road from a nonpriority road, the vehicle-mounted driving supporting device comprising:

a transceiver that receives and transmits information to and from a road-installed driving supporting device:

a support determination unit which, when a host vehicle is a priority vehicle which is traveling on the priority road, determines whether or not the nonpriority vehicle is identical to a vehicle which performs communication through vehicle-vehicle communication, based on information which uniquely specifies the nonpriority vehicle received from a transceiver of the road-installed driving supporting device and information which uniquely specifies the vehicle which performs communication through vehicle-vehicle communication, wherein the support determination unit determines that the nonpriority vehicle can receive information of driving support from outside when the nonpriority vehicle is identical to the vehicle which performs communication through vehicle-vehicle communication, the support determination unit determines that the nonpriority vehicle cannot receive the information of driving support from the outside when the nonpriority vehicle is not identical to the vehicle which performs communication through vehicle-vehicle communication, and the vehicle-mounted driving supporting device does not execute the driving support for the host vehicle if the nonpriority vehicle can receive the information of driving support from the outside, and the vehicle-mounted driving supporting device executes the driving support for the host vehicle if the nonpriority vehicle cannot receive the information of driving support from the outside.

2. The vehicle-mounted driving supporting device according to claim 1, wherein, when the nonpriority vehicle can acquire information regarding the priority vehicle from the vehicle-mounted driving supporting device, the vehicle-mounted driving supporting device does not execute the driving support for the host vehicle.

3. A road-installed driving supporting device having a transceiver which transmits information regarding a nonpriority vehicle entering a priority road from a nonpriority road to a priority vehicle which is traveling on the priority road, the road-installed driving supporting device comprising:

a specification determination unit which determines whether the nonpriority vehicle can receive information of driving support from outside based on a detection result output from a vehicle detector and uplink information output from a vehicle which can receive the information of driving support from the outside, and an information processing unit which does not transmit information of the nonpriority vehicle to the priority vehicle if the nonpriority vehicle can receive the information of driving support from the outside, and transmits the information of the nonpriority vehicle to the priority vehicle if the nonpriority vehicle cannot receive the information of driving support from the outside.

* * * * *